(12) United States Patent
Tang et al.

(10) Patent No.: US 6,598,063 B1
(45) Date of Patent: Jul. 22, 2003

(54) FAST CALCULATION OF $(A/B)^K$ BY A PARALLEL FLOATING-POINT PROCESSOR

(75) Inventors: Ping Tak Peter Tang, Hayward, CA (US); Theodore E. Kubaska, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 452 days.

(21) Appl. No.: 09/638,442

(22) Filed: Aug. 14, 2000

(51) Int. Cl.[7] .............................................. G06F 7/552
(52) U.S. Cl. ...................................................... 708/606
(58) Field of Search ............................... 708/606, 605, 708/500

(56) References Cited

U.S. PATENT DOCUMENTS

| | | | | |
|---|---|---|---|---|
| 6,128,638 A | * | 10/2000 | Thomas ....................... | 708/606 |
| 6,260,056 B1 | * | 7/2001 | Dalal ........................... | 708/606 |
| 6,363,407 B1 | * | 3/2002 | Miyasaka et al. ........... | 708/606 |
| 6,381,625 B2 | * | 4/2002 | Oberman et al. ........... | 708/606 |

OTHER PUBLICATIONS

John Harrison, et al, *The Computation of Transcendental Functions on the IA–64 Architecture*, Intel Technology Journal Q4, 1999.

Knuth, D.E., *The Art of Computer Programming, vol. 2: Seminumerical Algorithms*. Addison–Wesley, 1969, pp. 468–469.

Muller, J.–M., *Elementary Functions: Algorithms and Implementation*. Birkhauser 1997, Section 3.7.2, Estrin's Method.

\* cited by examiner

*Primary Examiner*—David H. Malzahn
(74) *Attorney, Agent, or Firm*—Blakely, Sokoloff, Taylor & Zafman LLP (57) ABSTRACT

A method suitable for calculating an expression having the form $(A/B)^K$ by a processor that features separate sets of floating point units which can operate in parallel for greater speed of execution. The processor issues instructions to determine an approximate reciprocal $R_0$ of a first variable B. Further instructions are issued to raise a second variable to the power of a third variable K by a first set of arithmetic units of the processor, where the second variable is a function of the approximate reciprocal $R_0$. Still further instructions are issued to calculate a polynomial q at a fourth variable delta by a second set of arithmetic units of the processor. The fourth variable delta is also a function of the approximate reciprocal $R_0$. Finally, one or more instructions are issued to multiply the calculated polynomial by the second variable, having been raised to the power of the third variable, to yield $(A/B)^K$.

25 Claims, 4 Drawing Sheets

FAST CALCULATION OF $(A/B)^K$ BY A PARALLEL FLOATING-POINT PROCESSOR

FIELD OF THE INVENTION

This invention is generally related to high accuracy and low latency techniques for computing mathematical expressions of the form $(A/B)^K$ using a data processor having parallel floating-point arithmetic units in hardware.

BACKGROUND

Most general purpose data processors have only a very basic hardware arithmetic capability, e.g. add, multiply, and divide. Thus, computing a transcendental function such as arctan(x) requires rewriting the function in terms of these basic arithmetic operations, so that the processor can execute the function. Conventional software math libraries contain subroutines, which are typically written in the assembly language of a particular processor, that are optimized to compute a function with high accuracy yet using only the basic arithmetic operations. The methodology of the subroutine is also designed to take advantage of any parallel floating-point processing capability in the processor. For instance, if the rewritten form of the function, sometimes referred to as a series expansion, has multiple instances of the type (A+B), then independent (A+B) parts of the expansion can be placed in two or more instructions that will be executed simultaneously, thereby reducing the latency of computing the function.

Expressions of the form $(A/B)^K$, where A and B are real numbers and K is an integer, often need to be computed as part of software-implemented mathematical functions. However, modern machines such as the ITANIUM processor by Intel Corp. do not support the division operation A/B in hardware. The ITANIUM processor supports fused multiply add (FMA) floating-point operations of the form AB+C. In addition, this processor has multiple floating-point units in hardware for parallel instruction execution, and is an example of an explicit parallel instruction computer (EPIC) in which two floating-point arithmetic operations, two memory access operations, and two integer arithmetic operations can be executed in parallel.

A conventional technique for computing $(A/B)^K$ on a machine such as the ITANIUM processor that does not support division may include the following three steps: (1) reciprocal calculation R=1/B, by first using the well-known approximate reciprocal operator $R_0$=frcpa(B)=(1/B)(1+Δ) and then applying an iterative process to refine the approximation $R_0$ to obtain the needed accuracy in R, (2) quotient calculation Q=AR, and (3) power calculation $Q^K$. All three steps can be performed with no divisions, only multiply and add operations.

The overall latency of computing $(A/B)^K$ is dominated by the first and third steps, i.e. the reciprocal and power calculation steps. In machines that have parallel floating-point units, the power calculation can be optimized to take advantage of such parallelism. However, before the power calculation can be performed, the reciprocal calculation must first be completed, such that it is said to lie in the "critical path" of the overall calculation. This conventional reciprocal calculation is very time consuming, particularly because of the complex iterative procedure needed to enhance the accuracy of the approximate reciprocal. Thus, the combination of the conventional reciprocal calculation in the first step and the power calculation in the third step severely limits the ability to shorten the latency of the overall calculation.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

According to an embodiment of the invention, the overall latency of computing $(A/B)^K$ may be reduced, without compromising accuracy, by not immediately correcting the approximate reciprocal $R_0$. Instead, the method involves computing $(AR_0)$ and $Δ=(BR_0)−1$, in parallel if desired (each in a single, separate instruction), followed by computing the power calculations $M=(AR_0)^K$ and $N=(1+Δ)^{−K}$ in parallel, and finishing with the single-instruction multiplication MN, which yields the final result $(A/B)^K$. Overall latency may be greatly reduced because the reciprocal and power calculations that are performed sequentially in the conventional technique are essentially replaced by (1) the two power calculations for M and N being performed in parallel and (2) a final multiplication MN. This technique takes advantage of the parallel floating-point arithmetic capability in the processor to achieve a substantial reduction in overall latency. For instance, when computing $(A/B)^{16}$ using the conventional methodology optimized for the ITANIUM processor, 55 processor clock cycles were needed. In contrast, an embodiment of the invention yielded only 37 cycles on the same machine for the same accuracy, a reduction in overall latency of more than 30%.

Figure 1:
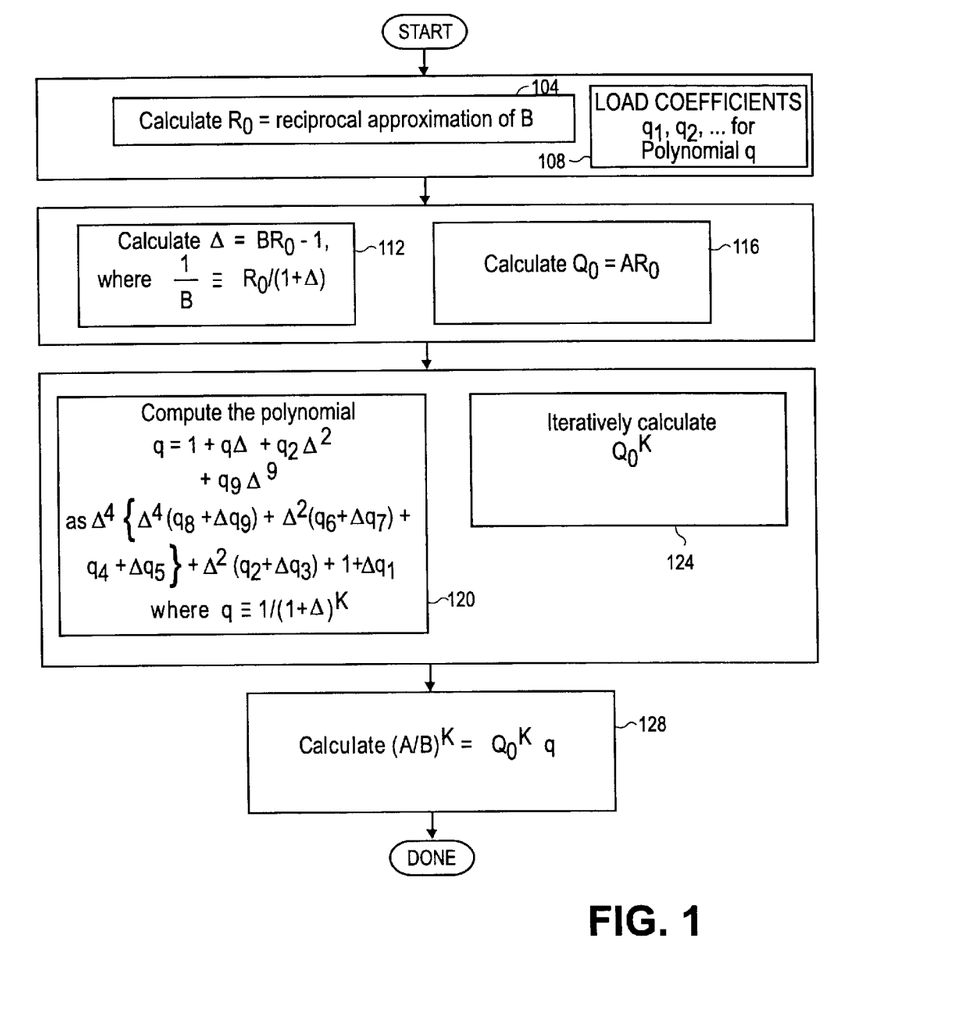
FIG. 1 illustrates a flow diagram of a method for calculating an expression of the form $(A/B)^K$ according to an embodiment of the invention.
Figure 4:
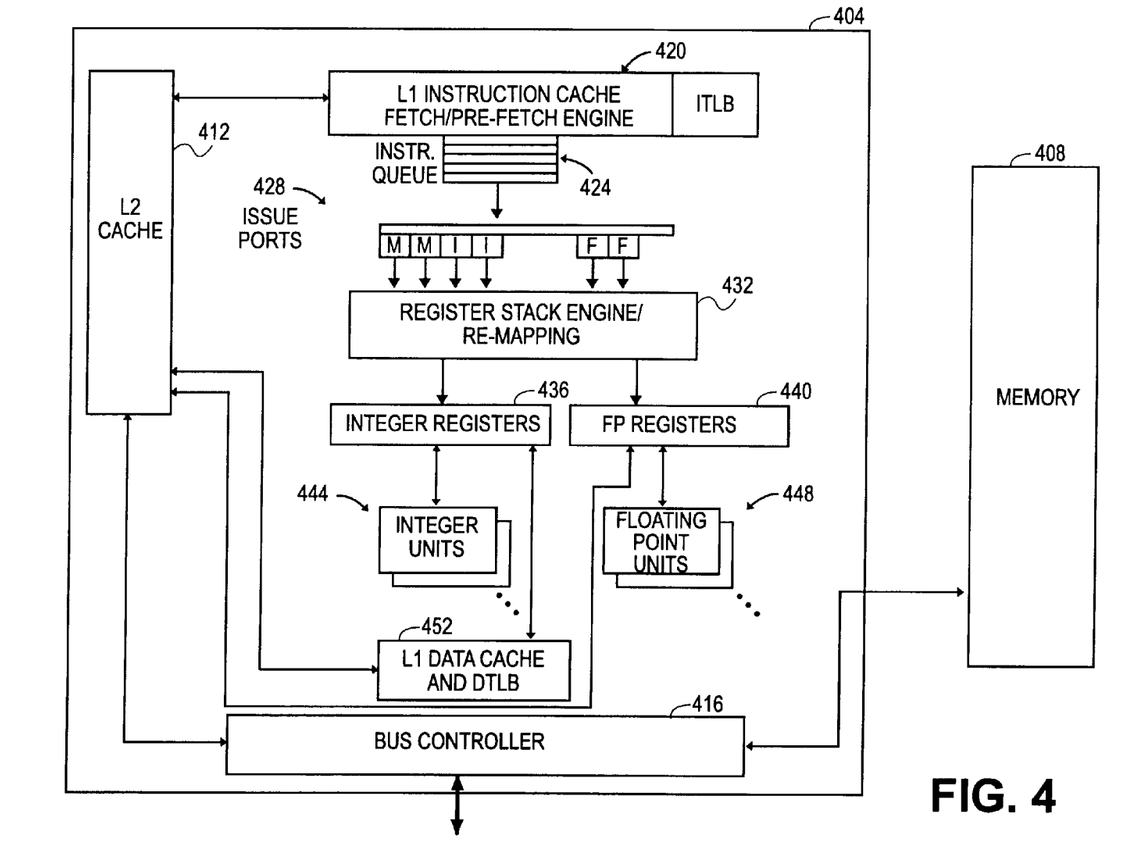
FIG. 4 illustrates a block diagram of a processor for executing instructions, according to another embodiment of the invention.

FIG. 1 illustrates a flow diagram of a method for calculating an expression of the form $(A/B)^K$ using a processor having at least two sets of arithmetic units that are separate and that can operate in parallel. An example of such a processor is the ITANIUM processor by Intel Corp. whose block diagram is shown in FIG. 4. The relevant details of the processor in FIG. 4 will be discussed below, following a description of the mathematical operations in FIG. 1. Beginning with operation 104, here the processor issues one or more instructions to determine (e.g. calculate and/or lookup) an approximate reciprocal $R_0$ of a first variable B. The approximate reciprocal may be implemented using conventional techniques, such as by using the basic floating-point reciprocal approximation instruction referred to sometimes as the "frcpa" instruction which looks up the result in a hardwired on-chip table. For instance, the frcpa(a) may approximate 1/a using a lookup on the top 8 bits of the normalized input, which approximates 1/a to about 8 bits of accuracy, or about 3 to 4 digits of accuracy. A wide range of different implementations for the approximate reciprocal may be used. Note that the 3 or 4 digits of accuracy in frcpa(a) is typically not sufficiently accurate for floating point calculations specified by industry standards such as Institute of Electrical and Electronics Engineers (IEEE) double precision.

To obtain a general form of the expression $(A/B)^K$, operation 116 may be computed once the approximate reciprocal $R_0$ has been obtained, by multiplying the approximate reciprocal by the variable A to obtain $Q_0$. This multiplication, however, is unnecessary if the value of the variable A were known to be 1. Such a simplification, for instance, occurs when expanding the arctangent function into a series, as described in FIG. 2 below.

Following issuance of the instructions needed to calculate the approximate reciprocal, the processor issues one or more instructions to calculate the variable $\Delta$ according to operation 112. The expression for $\Delta$ here is derived based on the definition $1/B=R_0/(1+\Delta)$ where $R_0$ is the approximate reciprocal of B. Note that operations 112 and 116 depend on a previously obtained value for $R_0$, but can otherwise be computed in parallel, by instructions that are fed to separate arithmetic units of the processor that can operate in parallel. As will be further discussed below, the assembly language subroutine which implements the flow diagram of FIG. 1 should be optimized to take advantage of such a parallel floating point capability of the processor.

Once the variables $\Delta$ (in operation 112) and $Q_0$ (in optional operation 116) have been obtained, the processor's arithmetic units may compute the expressions indicated in operations 120 and 124. More particularly, separate sets of arithmetic units that can operate in parallel should be assigned the tasks of computing the expressions in operations 120 and 124 respectively. It is expected that a significant reduction in the latency of the overall calculation of $(A/B)^K$ may be due to performing these operations 120 and 124 in parallel. This is possible because these two operations do not depend upon each other, and they can be separately started as soon as the values for $\Delta$ and $Q_0$ have been obtained.

Referring now to the operation 120 in some greater detail, the polynomial q may be more efficiently evaluated if rewritten as $\Delta^4$ $(\Delta^4(q8+\Delta q9)+\Delta^2(q6+\Delta q7)+q4+\Delta q5)+\Delta^2 (q2+\Delta q3)+1+\Delta q1$ based upon the definition $q=1/(1+\Delta)^K$. Although a ninth order polynomial for q is given as an example here, the invention is not limited to a particular order of the polynomial. The order of the polynomial q may be selected to balance the trade off between increased accuracy and greater latency of the overall calculation, in view of the value of K and the initial accuracy of the approximate reciprocal $R_0$.

The instructions that serve to raise the variable $Q_0$ to the power of K in operation 124 may be selected and arranged such that a separate set of arithmetic units in the processor are used to compute this power calculation. Any conventional iterative technique that uses the basic arithmetic operations of multiplication and addition may be optimized to iteratively calculate $Q_0^K$. For certain embodiments of the invention in which K is a positive integer, certain well known optimizations may be used to further reduce the latency of completing the operation 124. Since the power calculation in operation 124 can be performed in parallel with the polynomial computation in operation 120, a significant reduction in overall latency may be achieved.

To help further reduce the latency of the overall calculation, the coefficients q1, q2, . . . for computing the polynomial q in $\Delta$ may be loaded in a separate operation 108. Instructions for loading the registers of the processor with these coefficients may be arranged to issue in such a way that the loading of the registers may be completed (1) prior to the start of the calculation of the polynomial q, and (2) in parallel with at least one of calculating the approximate reciprocal $R_0$ (operation 104) and calculating $\Delta$ (operation 112). When something is said to occur in "parallel" with a calculation, what's intended is that one or more instructions may be selected and arranged in such a way that the separate arithmetic units of the processor may provide their respective results during the same cycle of the processor clock, thereby ultimately resulting in a reduction in the overall latency. In addition, memory operations can occur in parallel with the calculation, such as in the ITANIUM processor which supports very long instruction word (VLIW) types of instructions.

Finally, once the polynomial in q has been calculated and $Q_0$ has been raised to the power of K, a single additional instruction is needed to calculate the overall result $(A/B)^K$ by multiplying $Q_0^K$ by q in operation 128.

The methodology of FIG. 1 described above may be applied to variables A, B, and K that are either all integers or a mix of floating point variables and integers. For instance, when using the expression $(A/B)^K$ in computing a transcendental function such as the arctangent, A and B are floating point variables whereas K is a positive integer. Computing the arctangent is considered another embodiment of the invention, as described in FIG. 2.

Figure 2:
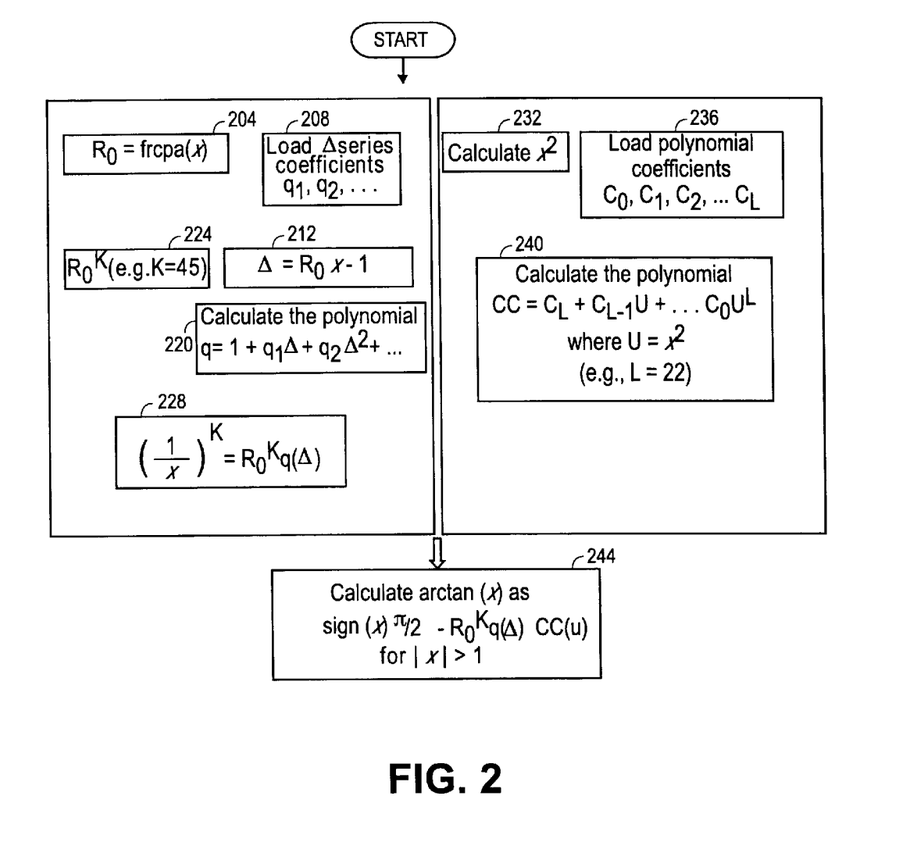
FIG. 2 shows a flow diagram for calculating arctan(x) according to another embodiment.

FIG. 2 depicts a flow diagram of a method for calculating arctan(x) when $|x|>1$, using a processor that has at least two sets of arithmetic units that are separate and that can operate in parallel. When $|x|>1$, the arc tangent may be written as $\arctan(x)=\text{sign}(x)\pi/2-\arctan(1/x)$. Note that $|1/x|<1$, so that a polynomical in $1/x$, $c(1/x)$, may be used to approximate $\arctan(1/x)$. This leads to the expression $\arctan(x) \sim \text{sign}(x)\pi/2-c(1/x)$. If we then express $c(1/x) \sim (1/x^2)^{L+1}cc(x)$, by factoring out the highest power of $(1/x)$ from $c(1/x)$, and where $cc(x)$ is $c(x)$ with the order of its polynomials reversed, the calculation of $c(1/x)$ may be more efficiently computed according to the flow in FIG. 2 which takes advantage of machine parallelism and the flow of FIG. 1. Note that since $c(1/x)$ is an odd polynomial, $cc(x)$ is even, and thus may be written as $cc(u)$ where $u=x^2$, as shown in FIG. 1.

The block of operations in the left column of FIG. 2, which includes operations 204 through 228, correspond to operations 104 through 128 of the calculation for $(A/B)^K$ discussed in FIG. 1 above, and result in the calculation of $(1/x)_K$ where $K=2L+1$. The block of operations in the right hand column of FIG. 2 describe the flow for $cc(x)$ and are particular to the computation of arctan(x), where $\arctan(x)=\text{sign}(x)\pi/2-(1/x^{2L+1})cc(u)$ where $cc(u)=C_L+C_{L-1}u+C_{L-2}u^2+\ldots+c_0u^L$. It can be seen that the operations 232–240 in the right hand column results in the calculation of the polynomial cc at $u=x^2$ whereas the left hand column computes the ratio $(1/x^{2L+1})$. The arctan(x) is obtained in step 244 by multiplying the result from the left hand column in operation 228 by the result in the right hand column of operation 240 to get $R_0^{45}qcc$, which is then subtracted from sign $(x)\pi/2$. Thus, computing the arctan(x) requires, in addition to operations 204–228 which are not described here because they closely mirror operations 104–128 of FIG. 1, that the argument x of the arctangent function be raised to a power of 2 in operation 232, and then a polynomial cc be calculated at a variable $u=x^2$. Once again, note that to reduce the latency of the overall calculation, the polynomial coefficients $C_0, C_1, C_2, \ldots C_L$ may be pre-computed and loaded into the registers of the processor in operation 236 prior to having the instructions in operation 240 reach the floating point units. The calculation of the polynomial cc in operation 240 may be performed by issuing instructions according to conventional techniques of calculating such a polynomial.

Finally, in operation 244, a linear combination of (1) the product of the calculated polynomial cc and (2) π/2, based upon a sign of the argument x of the arctangent function, is calculated to yield the final result being the arctan(x). Note that the calculation of the polynomial cc in operation 240 can begin as soon as the value of $x^2$ in operation 232 has been determined. This calculation of the polynomial c can proceed in parallel with the calculation of the polynomial q in operation 220 and the power calculation $R_0^K$ in operation 224, provided of course that the processor has a sufficient number of floating point units that can operate in parallel.

Figure 3:
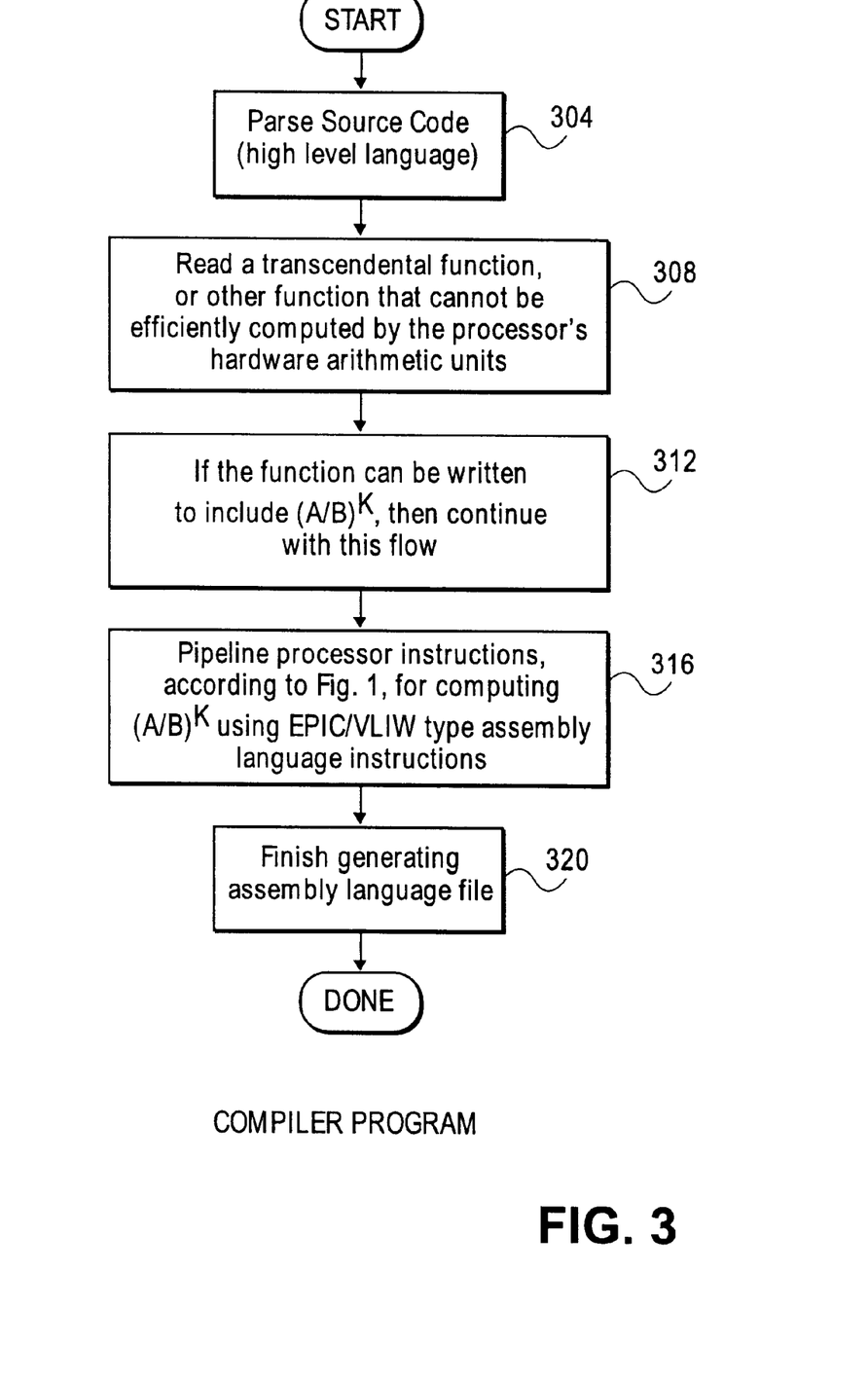
FIG. 3 depicts a flow diagram in a compiler program of another embodiment.

FIG. 3 illustrates a flow diagram of a compiler program that may be configured according to an embodiment of the invention. In particular, the compiler would have instructions that are stored in a machine-readable medium such as a computer's hard disk drive, program memory, or a portable non-volatile medium such as a compact disc, where the instructions can be executed by a processor having separate sets of arithmetic units that can operate in parallel. The compiler program would include an operation 304 in which the source code that may be written in a high level language is parsed according to conventional techniques. In operation 308, a transcendental function such as arctan(x), or other function that cannot be efficiently computed by the processor's hardware arithmetic units, is read as part of the source code. The compiler then continues with operation 312 in which it determines whether this function may be rewritten to include expressions of the form $(A/B)^K$. For the example of the arctan(x), the function may be rewritten as shown in FIG. 2 and described above. The compiler next proceeds with operation 316 in which processor instructions in assembly language are arranged in a pipeline fashion for computing all forms of $(A/B)^K$, according to the methodology of FIG. 1. These instructions may include VLIW types that ensure the parallel execution of several types of operations (e.g. fetch from memory, multiply, and add, all in the same processor clock cycle). An example assembly language subroutine for computing the arctangent of x on the ITANIUM processor may be found in source code provided by Intel Corp. via the World Wide Web, as part of its mathematical support functions for the C and FORTRAN programming languages for the IA-64 architecture processors.

Returning to FIG. 3, once the instructions have been pipelined according to FIG. 1, the compiler continues with operation 320 in which the generation of the assembly language file is completed and the file is ready for linking and conversion into object code for the particular processor.

A processor having multiple floating point units that can operate in parallel is illustrated in block diagram form in FIG. 4. The processor 404 has a built in level 2 cache 412 and a bus controller 416 which may receive instructions and data from an external bus (not shown). Alternatively, program instructions and data may be stored in a memory 408 which is also coupled to the bus controller 416. The processor 404 includes a combined level one instruction cache, fetch/pre-fetch engine and instruction translation look aside buffer (ITLB) 420. An instruction queue 424 feeds a number of issue ports 428 that have been arranged to receive branch instructions, memory access instructions (M), integer operation instructions (I), and floating point instructions (F) as indicated. The issue ports 428 feed a register stack engine/re-mapping unit 432 which configures onboard registers 436 and 440 for optimal parallel processing. These registers 436, 440 feed their respective branch and memory units (not shown), integer units 444, data cache and data translation look aside buffer unit 452 and finally, floating point units 448 that can operate in parallel. The processor 404 is an example of an EPIC type that allows a programmer to ensure the parallel execution of certain designated tasks, by selecting instructions, such as the fused multiply and add, that, by definition, force the processor to execute memory fetch and arithmetic operations in parallel. For instance, referring to FIG. 1, the calculation of Δ in operation 112 may be done by a single FMA instruction. Also, the calculation of q may include an FMA (AB+C) instruction in which A=$\Delta^4$, B is the quantity in brackets, and C=$\Delta^2$ (q2+Δq3)+1+Δq1. This is in contrast with other processors that, although allowing for the possibility of parallel execution (by the hardware recognizing parallelism in a sequence of instructions), do not guarantee such parallel execution at the level of the assembly language subroutine.

To summarize, various embodiments of the invention have been described that are directed to a method suitable for calculating an expression having the form $(A/B)^K$ by a processor that features separate floating point units that can operate in parallel for greater speed of execution. In the foregoing specification, the invention has been described with reference to specific exemplary embodiments thereof. It will, however, be evident that various modifications and changes may be made thereto without departing from the broader spirit and scope of the invention as set forth in the appended claims. For instance, any reference to "calculation" is understood to allow a determination by a look-up table, as well as an arithmetic operation. The specification and drawings are, accordingly, to be regarded in an illustrative rather than a restrictive sense.

What is claimed is:

1. A method comprising:
   issuing one or more instructions in a processor to determine an approximate reciprocal of a first variable;
   issuing a first plurality of instructions to raise a second variable to the power of a third variable by a first set of arithmetic units of a processor, where the second variable is a function of the approximate reciprocal of the first variable;
   issuing a second plurality of instructions to calculate a polynomial at a fourth variable by a second set of arithmetic units of the processor, wherein the second set is separate from and operates in parallel with the first set, and the fourth variable is proportional to the approximate reciprocal of the first variable; and
   issuing one or more instructions in the processor to multiply the calculated polynomial by the second variable having been raised to the power of the third variable.

2. The method of claim 1 further comprising:
   issuing one or more instructions to calculate the fourth variable by one of the first and second sets of arithmetic units operating upon the approximate reciprocal of the first variable and the first variable, prior to calculating the polynomial.

3. The method of claim 2 further comprising:
   issuing one or more instructions to load a plurality of registers in said processor with coefficients for the polynomial, and wherein the loading of the registers is to be completed (1) prior to the start of the calculation of the polynomial, and (2) in parallel with at least one of determining the approximate reciprocal and calculating the fourth variable.

4. The method of claim 1 further comprising:
   issuing one or more instructions to only one of the first and second sets of arithmetic units to calculate the second variable, by multiplying the approximate reciprocal by a fifth variable, and wherein the multiplication is to be completed prior to raising the second variable to the power of the third variable.

5. The method of claim 4 wherein the first and fifth variables are floating point variables and the third variable is a positive integer variable.

6. The method of claim 1 further comprising: issuing additional instructions to raise an argument of an arctangent function to a power of two, and then
   (a) calculate a second polynomial at a fifth variable being a function of the argument of the arctangent raised to the power of two, and
   (b) multiply the calculated second polynomial by the product of (1) the calculated polynomial and (2) the second variable having been raised to the power of the third variable.

7. The method of claim 6 further comprising:
   issuing additional instructions to calculate a linear combination of (1) the product in (b), and (2) one half of pi, based upon a sign of the argument of the arctangent function.

8. The method of claim 1 wherein the first variable is a floating point variable and the third variable is a positive integer variable.

9. An article of manufacture comprising:
   a machine readable medium having instructions stored therein that can be executed by a processor having first and second sets of arithmetic units that are separate and can operate in parallel, the instructions being selected and arranged so that
   one or more of the instructions cause the processor to determine an approximate reciprocal of a first variable, and then
   a first plurality of the instructions cause only the first set of arithmetic units to raise a second variable to the power of a third variable, where the second variable is a function of the approximate reciprocal of the first variable,
   a second plurality of the instructions cause only the second set of arithmetic units to calculate a polynomial at a fourth variable, wherein the fourth variable is a function of the approximate reciprocal of the first variable, and then
   one or more of the instructions cause the processor to multiply the calculated polynomial by the second variable having been raised to the power of the third variable.

10. The article of manufacture of claim 9 wherein the machine-readable medium has further instructions that when executed cause the processor to calculate the fourth variable by one of the first and second sets of arithmetic units operating upon the approximate reciprocal of the first variable and the first variable, prior to calculating the polynomial.

11. The article of manufacture of claim 10 wherein the machine-readable medium has further instructions that when executed cause the processor to load its registers with coefficients for the polynomial, and wherein the loading of the registers is to be completed (1) prior to the start of the calculation of the polynomial, and (2) in parallel with at least one of determining the approximate reciprocal and calculating the fourth variable.

12. The article of manufacture of claim 9 wherein the machine-readable medium has further instructions that are to be issued to only one of the first and second sets of arithmetic units to calculate the second variable, by multiplying the approximate reciprocal by a fifth variable, and wherein the multiplication is to be completed prior to raising the second variable to the power of the third variable.

13. The article of manufacture of claim 12 wherein the first and fifth variables are floating point variables and the third variable is a positive integer variable.

14. The article of claim 9 wherein the machine-readable medium has further instructions that when executed cause the processor to raise an argument of an arctangent function to a power of two, and then
   (a) calculate a second polynomial at a fifth variable being a function of the argument of the arctangent raised to the power of two, and
   (b) multiply the calculated second polynomial by the product of (1) the calculated polynomial and (2) the second variable having been raised to the power of the third variable.

15. The article of manufacture of claim 14 wherein the machine-readable medium has further instructions that when executed cause the processor to calculate a linear combination of (1) the product in (b), and (2) one half of pi based upon a sign of the argument of the arctangent function.

16. The article of manufacture of claim 9 wherein the first variable is a floating point variable and the third variable is a positive integer variable.

17. An apparatus comprising:
   a processor having first and second sets of arithmetic units that are separate and that can operate in parallel; units to issue two or more instructions in parallel; and
   a memory coupled to the processor and containing instructions to be executed by the processor, wherein the instruction issue logic in the processor can
   issue one or more of the instructions to determine an approximate reciprocal of a first variable, and then
   issue a first plurality of the instructions to raise a second variable to the power of a third variable only by the first set of arithmetic units, where the second variable is a function of the approximate reciprocal of the first variable,
   issue a second plurality of the instructions to calculate a polynomial at a fourth variable only by the second set of arithmetic units, wherein the fourth variable is a function of the approximate reciprocal of the first variable, and then
   issue one or more of the instructions to multiply the calculated polynomial by the second variable having been raised to the power of the third variable.

18. The apparatus of claim 17 wherein the instruction issue logic can issue further instructions to calculate the fourth variable by one of the first and second sets of arithmetic units operating upon the approximate reciprocal of the first variable and the first variable, prior to calculating the polynomial.

19. The apparatus of claim 18 wherein the processor further comprises:
   a plurality of registers coupled to the first and second sets of arithmetic units, wherein the instruction issue logic is to issue one or more instructions to load the registers with coefficients for the polynomial, and wherein the loading of the registers is to be completed (1) prior to the start of the calculation of the polynomial, and (2) in parallel with at least one of determining the approximate reciprocal and calculating the fourth variable.

20. The apparatus of claim 17 wherein the instruction issue logic can issue further instructions to only one of the first and second sets of arithmetic units to calculate the second variable, by multiplying the approximate reciprocal by a fifth variable, and wherein the multiplication is to be completed prior to raising the second variable to the power of the third variable.

21. The apparatus of claim 20 wherein the first and fifth variables are floating point variables and the third variable is a positive integer variable.

22. The apparatus of claim 17 wherein the instruction issue logic can issue further instructions to raise an argument of an arctangent function to a power of two, and then
  (a) calculate a second polynomial at a fifth variable being a function of the argument of the arctangent raised to the power of two, and
  (b) multiply the calculated second polynomial by the product of (1) the calculated polynomial and (2) the second variable having been raised to the power of the third variable.

23. The apparatus of claim 22 wherein the instruction issue logic can issue further instructions to calculate a linear combination of (1) the product in (b), and (2) one half of pi, based upon a sign of the argument of the arctangent function.

24. The apparatus of claim 17 wherein at least one of the first and second sets of arithmetic units includes a fused multiply add (FMA) unit to compute an expression of the form AB+C in one cycle of a processor clock.

25. The apparatus of claim 24 wherein the first variable is a floating point variable and the third variable is a positive integer variable.

* * * * *

UNITED STATES PATENT AND TRADEMARK OFFICE
CERTIFICATE OF CORRECTION

PATENT NO. : 6,598,063 B1
DATED : July 22, 2003
INVENTOR(S) : Tang et al.

It is certified that error appears in the above-identified patent and that said Letters Patent is hereby corrected as shown below:

Title page,
Item [73], delete "Intel" and insert -- Intel --.

Column 2,
Line 33, delete "power." and insert -- power --.

Column 8,
Line 27, after "parallel;" insert -- instruction issue logic coupled to the first and second sets of arithmetic --.

Signed and Sealed this

Thirtieth Day of December, 2003

JAMES E. ROGAN
*Director of the United States Patent and Trademark Office*